Feb. 9, 1943. R. L. WIMBISH 2,310,821
CHASSIS FRAME SUSPENSION
Filed Nov. 1, 1941
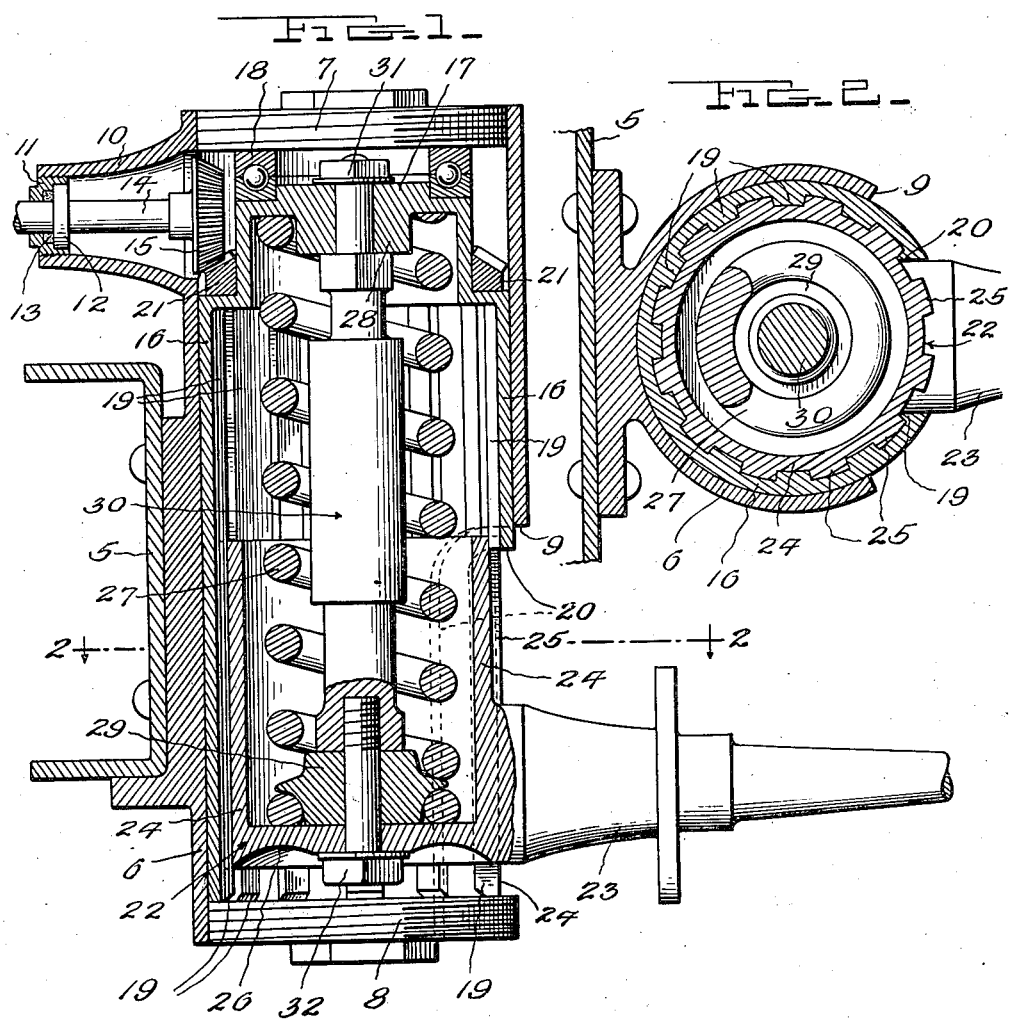
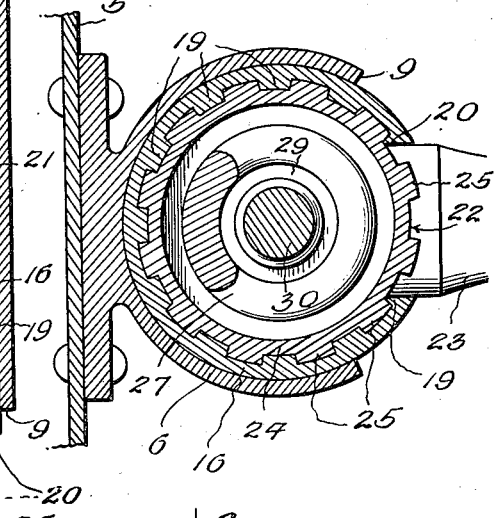
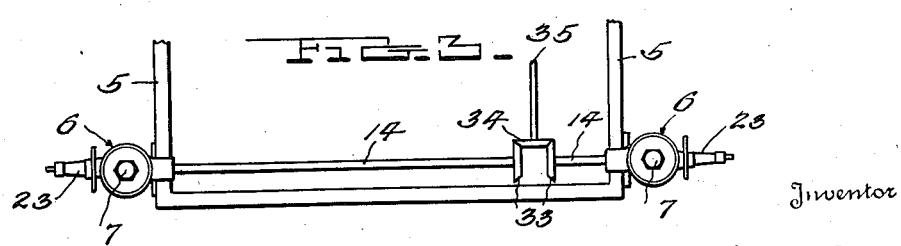
Inventor
R. L. Wimbish
By J. R. Pierce, Attorney Patented Feb. 9, 1943

2,310,821

UNITED STATES PATENT OFFICE 2,310,821

CHASSIS FRAME SUSPENSION

Raymond L. Wimbish, Roanoke, Va.

Application November 1, 1941, Serial No. 417,553

6 Claims. (Cl. 280—96.2)

The invention aims to provide a new and improved suspension designed primarily for the front ends of automobile chassis frames, the improved structure being such that the desirable easy-riding qualities of "knee action" may be retained without the use of a great many customarily used parts which not only add to cost of manufacture and also add weight, but cause such troubles as replacement of king pins, bushings, ball joints, etc., and are prone to cause maladjustment of wheels, faulty steering and excessive wear on tires, particularly the wear caused by the lateral scuffing movements of the tires on the road, which scuffing is inevitable with customary "knee action."

With the foregoing in view, the invention resides in the novel subject matter hereinafter described and claimed, description being accomplished by reference to the accompanying drawing.

Fig. 1 is a vertical sectional view through the suspension for one wheel.

Fig. 2 is a horizontal sectional view on line 2—2 of Fig. 1.

Fig. 3 is a small diagrammatic top plan view showing the preferred manner of connecting the steering shafts of the two front suspensions with a steering wheel shaft.

In the drawing above briefly described, a preferred construction has been illustrated, and while this construction will be rather specifically described, it is to be understood that within the scope of the invention as claimed, variations may be made.

To each side bar 5 of the chassis frame, is rigidly secured a vertical cylinder 6 having its upper and lower ends closed by suitably locked screw plugs 7 and 8, the side of said cylinder opposite said bar 6 being formed in its lower portion with a downwardly open notch 9. Near its upper end, the cylinder 6 is provided with a lateral tubular boss 10 which overlies the bar 5, the free end of said boss being provided with a screw plug 11 containing a roller or ball bearing 12 and a grease seal 13. A horizontal steering shaft 14 extends through the bearing 12 and seal 13 and is provided with a beveled pinion 15 at its inner end.

A sleeve 16 is rotatably received in the fixed cylinder 6 and is provided with an upper end wall 17, the lower end of said sleeve 16 being open and disposed against the plug 8. A ball or roller bearing 18 is interposed between the sleeve end wall 17 and the screw plug 7 and supports the cylinder 6 upon the sleeve 16, the latter being yieldably supported as hereinafter described. Internal splines 19 are formed on the sleeve 16 and the lower portion of said sleeve is formed with a downwardly open notch 20. Near its upper end, this sleeve is provided with a beveled ring gear 21 which meshes with the lower side of the pinion 15.

Vertically slidable within the sleeve 16 is an upwardly open cupped piston 22 having a rigid wheel spindle 23 which extends through the notches 20 and 9, notch 20 being only wide enough to receive said spindle while notch 9 is sufficiently wide to allow forward and rearward movement of said spindle for steering. The skirt 24 of the piston 22 is provided with external splines 25 meshing with the splines 19 of the sleeve 16, and the head 26 of said piston supports a vertical coiled spring 27. This spring 27 yieldably supports the sleeve 16, the upper end wall 17 of this sleeve being provided with a centering boss 28 fitting into the upper convolution of said spring. A spring clamping and centering member 29 is received within the lower convolution of the spring 27 and is secured upon the piston head 26.

Within the spring 27 is a telescopic shock absorber 30, the upper end of which is secured at 31 to the sleeve end wall 17, the lower end of said shock absorber 30 being secured to the piston head 26. A single cap screw 32 may well be employed to secure both the lower end of the shock absorber 30 and the member 29 to the piston head.

The weight of the chassis frame and its load is transmitted to the sleeve 16 by the cylinder 6 and the bearing 18; this sleeve 16 is yieldably supported by the spring 27; this spring is supported by the piston 22; and this piston is supported by the spindle 23. As relative movements of the chassis frame and the spindle occur, sleeve 16 slides upon piston 22, and both 16 and 22 are connected by the splines 19 and 25 to turn unitarily for steering when 16 is turned by means of shaft 14, pinion 15 and ring gear 21. All up and down movements of the wheel are vertical and there is thus no lateral scuffing away of the tire tread as with conventional "knee actions" requiring that the distance between the lower parts of the two front wheels be constantly changing as the wheels and chassis relatively move vertically. Moreover, it is easier to keep the wheels in alinement, on caster, and on camber with the improved structure. Then too, numerous parts which have heretofore caused trouble and have added weight and increased cost, have been dispensed with, with obvious advantages. Whenever repair or internal inspection are required, all parts within the cylinder 6 may be readily removed by removing the lower plug 8. Adjustment for wear between pinion 15 and gear 21 may be effected by adjustment of both plugs 7 and 8.

In connecting the two steering shafts 14 of the two front suspensions, they are preferably provided with beveled gears 33 meshing with a beveled pinion 34 on a steering wheel shaft 35. Suitable bearings (not shown) are, of course, provided for the adjacent ends of the shafts 14 and 35 and appropriate provision may be made to adjust for wear compensation.

From the foregoing, it will be seen that novel and advantageous provision has been made for attaining the desired ends, but attention is again invited to the possibility of making variations over the construction herein disclosed.

I claim:

1. In a chassis frame suspension, a vertical cylinder rigidly secured to the chassis frame, cylinder closures secured to the upper and lower ends of said cylinder, a vertical sleeve rotatably received in said cylinder and substantially coextensive in length therewith, said sleeve having an upper end wall and being provided with internal splines, a weight supporting bearing interposed between said upper end wall of said sleeve and the upper end closure of said cylinder, a piston slidable in said sleeve and having external splines meshed with said splines of said sleeve, a coiled vertical weight supporting spring supporting said upper end wall of said sleeve, the lower end of said spring being supported by said piston, a wheel spindle rigidly secured to said piston and projecting laterally therefrom, said sleeve and cylinder having openings through which said spindle extends for required movements, and means operatively connected with said sleeve for rotating the same for steering.

2. In a chassis frame suspension, a vertical cylinder rigidly secured to the chassis frame, cylinder closures secured to the upper and lower ends of said cylinder, a vertical sleeve rotatably received in said cylinder and substantially coextensive in length therewith, said sleeve having an upper end wall and being provided with internal splines, a weight supporting bearing interposed between said upper end wall of said sleeve and the upper end closure of said cylinder, a piston slidable in said sleeve and having external splines meshed with said splines of said sleeve, a coiled vertical weight supporting spring supporting said upper end wall of said sleeve, the lower end of said spring being supported by said piston, a vertical telescopic shock absorber within said spring and secured to said sleeve end wall and piston, a wheel spindle rigidly secured to said piston and projecting laterally therefrom, said sleeve and cylinder having openings through which said spindle extends for required movements, and means operatively connected with said sleeve for rotating the same for steering.

3. In a chassis frame suspension, a vertical cylinder rigidly secured to the chassis frame, cylinder closures secured to the upper and lower ends of said cylinder, a vertical sleeve rotatably received in said cylinder and substantially coextensive in length therewith, said sleeve having an upper end wall and being provided with internal splines, a weight supporting bearing interposed between said upper end wall of said sleeve and the upper end closure of said cylinder, a piston slidable in said sleeve and having external splines meshed with said splines of said sleeve, a coiled vertical weight supporting spring supporting said upper end wall of said sleeve, the lower end of said spring being supported by said piston, a wheel spindle rigidly secured to said piston and projecting laterally therefrom, said sleeve and cylinder having openings through which said spindle extends for required movements, a ring gear secured to said sleeve, a horizontal steering shaft having a pinion meshing with said ring gear, and bearing means for said steering shaft carried by said cylinder.

4. A structure as specified in claim 1; said piston being cupped and upwardly open, the lower portion of said spring being within said piston.

5. A structure as specified in claim 2; said piston being cupped and upwardly open, the lower portions of said spring and shock absorber being within said piston.

6. A structure as specified in claim 3; said ring gear being in mesh with the lower portion of said pinion; said closures for said cylinder consisting of screw plugs, said sleeve being vertically adjustable by means of said screw plugs to compensate for wear of said pinion and ring gear.

RAYMOND L. WIMBISH.